United States Patent
Hiraku et al.

(10) Patent No.: US 6,725,837 B2
(45) Date of Patent: Apr. 27, 2004

(54) FUEL SUPPLY SYSTEM

(75) Inventors: Kenji Hiraku, Chiyoda (JP); Kenichiro Tokuo, Chiyoda (JP); Tadahiko Nogami, Mito (JP); Kunihiko Takao, Tsuchiura (JP); Hiroyuki Yamada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/056,081

(22) Filed: Jan. 28, 2002

(65) Prior Publication Data
US 2002/0157646 A1 Oct. 31, 2002

(30) Foreign Application Priority Data

Mar. 15, 2001 (JP) ......................... 2001-073282

(51) Int. Cl.⁷ ..................... F02M 7/00; F02M 37/04
(52) U.S. Cl. ...................... 123/436; 123/456
(58) Field of Search ................. 123/436, 419, 123/357, 446, 456, 496, 506, 179.17

(56) References Cited

U.S. PATENT DOCUMENTS 6,024,064 A * 2/2000 Kato et al. ............ 123/179.17
6,065,436 A * 5/2000 Koga et al. ............ 123/179.17
6,105,554 A * 8/2000 Nishiyama ................ 123/436
6,131,548 A * 10/2000 Yano ......................... 123/456
6,164,264 A * 12/2000 Thomas ..................... 123/300
6,192,864 B1 * 2/2001 Nishimura ................. 123/458
6,257,204 B1 * 7/2001 Kamijo et al. ............ 123/456
6,349,702 B1 * 2/2002 Nishiyama ................ 123/456

FOREIGN PATENT DOCUMENTS

JP   11-036935   2/1999
JP   11-294243   10/1999

* cited by examiner

Primary Examiner—Carl S. Miller
(74) Attorney, Agent, or Firm—Antonelli, Terry, Stout & Kraus, LLP

(57) ABSTRACT

The unevenness of injection rates of cylinders is reduced in a fuel supply system of a direct injection engine which uses a variable-displacement single plunger pump. The unevenness of injection rates of cylinders can be reduced by effecting a control such that the cam 100, which drives the high-pressure fuel pump 101, makes one reciprocation, while the engine makes explosions in two cylinders, and by causing the controller 55 to extend the injection time width of one of two injectors 54 which inject during one discharge of the high-pressure fuel pump and to shorten the injection time width of the other injector.

15 Claims, 9 Drawing Sheets

FUEL SUPPLY SYSTEM

BACKGROUND OF THE INVENTION

This invention relates to a fuel supply system for a direct injection type engine.

A fuel supply system has been disclosed, for example, in Japanese Application Patent Laid-open Publication No. Hei 11-294243, in which a system ever-changing fuel pressures are detected using sensors, an actual fuel injection rate of each fuel injection valve (hereinafter called an injector) is calculated from data sent from the sensors, and the fuel injection command value of each injector is corrected so as to match the actual fuel injection rate with a target fuel injection rate, thus evening off the fuel injection rates at each of the cylinders.

Further, Japanese Application Patent Laid-open Publication No. Hei 11-36935 discloses a system for obtaining a target fuel injection rate by extending the fuel injection time of an injector when the actual fuel pressure is lower than a target fuel pressure and shortening the fuel injection time of an injector when the actual fuel pressure is higher than a target fuel pressure.

A system is disclosed in Japanese Application Patent Laid-open Publication No. Hei 11-294243 in which it is necessary to fetch and calculate quickly changing fuel pressures at a high speed and output resulting signals to injectors. This increases the load on the controller. Each fuel injection by an injector is some milliseconds long, and the fuel pressure changes greatly also in some milliseconds. However, the controller usually requires in some milliseconds to 10 milliseconds to effect calculations. Therefore, it is difficult for the controller to precisely detect a quickly-changing fuel pressure. Further, it is assumed that an expensive controller is required to process such data at a high speed.

Finally, a system is disclosed in Japanese Application Patent Laid-open Publication No. Hei 11-36935 which uses only one pressure sensor to correct injection time periods of all injectors at one time from data obtained by the sensor. However, this technique cannot reduce the unevenness of injection rates of the injectors.

SUMMARY OF THE INVENTION

The primary object of the present invention is to provide a fuel supply system for an engine which can correct injection command values for respective injectors without using information based on ever-changing fuel pressures and reduce the unevenness of injection rates of the injectors.

The above object can be attained by a fuel supply system for a direct injection type engine comprising a fuel pump which supplies fuel to injection valves from a comparison chamber by varying the volume of the compression chamber by reciprocal movement of a single-cylinder plunger; a driving mechanism which produces one reciprocal movement of said plunger while said injection valves inject fuel into as many as two cylinders; and a controller which controls said fuel pump to adjust the fuel supply pressure, the injection start timing, and the injection time width of said fuel injection valve, wherein said controller operates to make the injection time width of one of said two fuel injection valves longer and that of the other fuel injection valve shorter.

The above object can also be attained by said fuel supply system, wherein said controller operates to detect the start timing and time width of intermittent fuel discharge that said high pressure fuel pump produces in synchronism with said plunger and to correct the fuel injection time width of each fuel injection valve relative to a target injection time width according to a time period during which the discharge period of said high-pressure fuel pump and the injection period of said fuel injection valve overlap with each other, the target injection time width of each fuel injection valve being calculated from the running status of said direct injection engine and the mean value of said fuel supply pressures.

The above object can also be attained by said fuel supply system, wherein said controller operates to compare the phase of the discharge time period of said high pressure fuel pump with the phase of the injection time period of said fuel injection valve, to determine whether to increase or decrease said fuel injection time width for correction, to determine a maximum injection time width to be corrected from said target fuel injection time width and the mean value of said fuel supply pressures, to subtract the correction time period to be given to each fuel injection valve according to the extent of overlapping between said discharge time period and said injection time period from said maximum fuel injection time width for correction, and to output the result.

The above object can also be attained by said fuel supply system, wherein said controller operates to detect an overlapping between the discharge time period of said high pressure fuel pump and the injection time period of said fuel injection valve. If there is no overlapping between them, the controller operates to shorten the injection time period of a first fuel injection valve that first injects fuel after one discharge by said high pressure fuel pump is completed and to extend the injection time period of a second fuel injection valve that injects fuel next; whereas, if there is an overlapping and if the high pressure fuel pump supplies about one fourth or less of the whole fuel discharge quantity by the injection start timing of the fuel injection valve, whose injection time period overlaps the discharge time period, the controller operates to extend the injection time period of the fuel injection valve whose injection time period overlaps the discharge time period and to shorten the injection time period of the other fuel injection valve; or, if the high pressure fuel pump supplies about one fourth or more of the whole fuel discharge quantity, the controller operates to shorten the injection time period of the fuel injection valve whose injection time period overlaps the discharge time period and to extend the injection time period of the other fuel injection valve.

The above object can also be attained by said fuel supply system, wherein said controller operates to detect a pressure of supplying fuel to said fuel injection valve, to extend the injection time width of a fuel injection valve whose fuel supply pressure is lower then a given value, and to shorten the injection time width of a fuel injection valve whose fuel supply pressure is higher than a given value.

DESCRIPTION OF THE INVENTION

The object of the present invention is to provide a fuel supply system comprising a variable-volume single plunger pump which can produce a single discharge while injectors for two cylinders inject fuel, and a controller which controls the variable volume of the pump to keep the fuel supply pressure approximately constant.

Usually a single plunger pump intermittently takes fuel in and out. This causes the discharge pressure to pulsate greatly and causes uneven injection rates of the injectors. The present invention can solve this problem and makes the most of features of the pump, such as low cost and energy saving.

Various embodiments of the present invention will be explained in connection with the accompanying drawings.

Figures 1A, 1B:
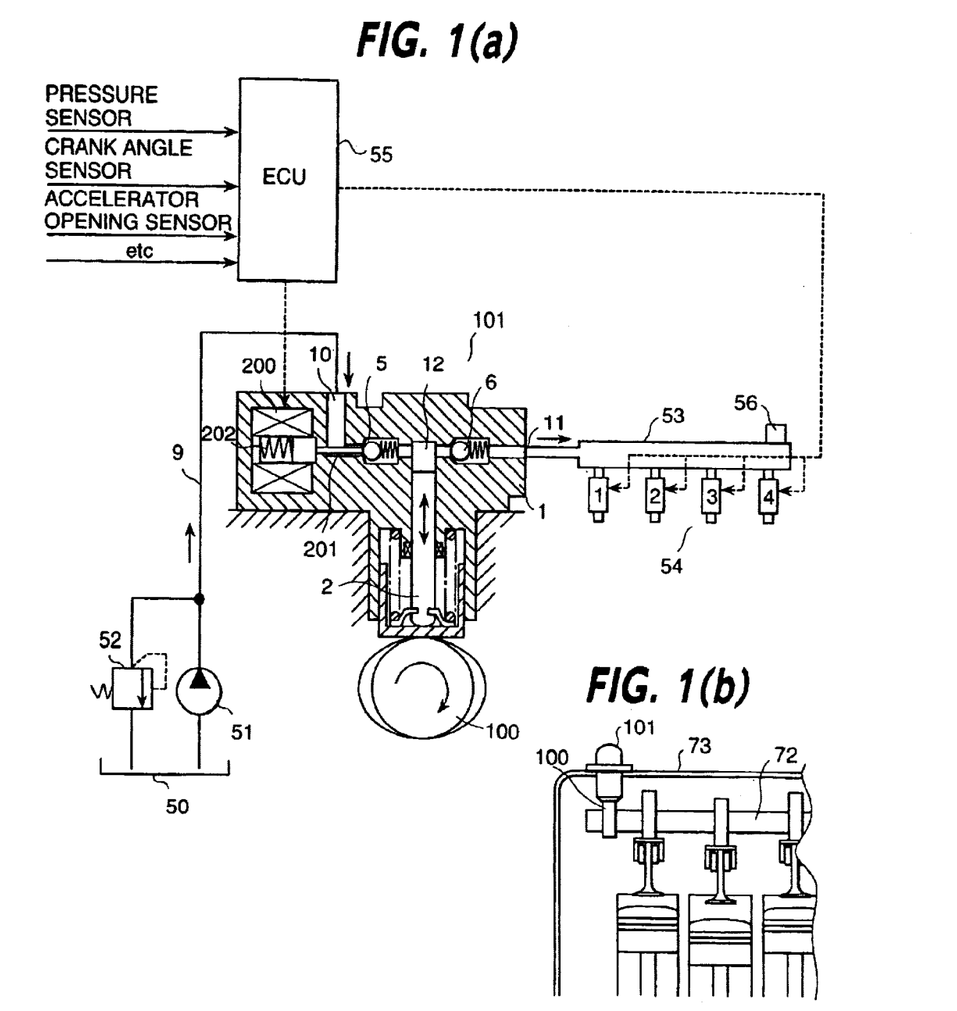
FIG. 1(a) is a schematic diagram of a fuel supply system of the present invention.
FIG. 1(b) is a schematic diagram of a direct injection engine in which the fuel supply system is employed.

FIG. 1(a) is a schematic diagram of a fuel supply system which represents an embodiment of the present invention, showing the details of a variable-displacement single plunger pump being used as a high-pressure fuel pump, and FIG. 1(b) shows a portion of the direct injection engine in which the system is used.

Referring to FIG. 1(a), the part 101 represents the whole high-pressure fuel pump, in which there is a pump 1 which contains a suction passage 10, a discharge passage 11, and a compression chamber 12. The compression chamber 12 contains a sliding plunger 2, which operates as a pressurizing member. The plunger 2 is continuously bias against a cam 100 by a spring so that the plunger in contact with the profile of the cam may go up and down as the cam 100 revolves. As seen in FIG. 1(b), the cam 100 is mounted on the engine cam shaft 72 beneath the engine cover 73. The suction passage 10 and the discharge passage 11 respectively contain a suction valve 5 and a discharge valve 6. Each of these valves is pushed by a spring to allow fuel to flow only in a preset direction. In other words, these valves operate as non-return valves. The pump 1 contains a solenoid 200 having a connecting member 201 and a spring 202. As shown in FIG. 1(a), when the solenoid is off, the connecting member 201 is pushed by the spring 202 to open the suction valve 5, since as the pushing force of the spring 202 is greater than the pushing force of the spring in the suction valve 5.

Fuel is transferred from a tank 50 to the fuel inlet of the pump 1 by a low-pressure pump 51, that is controlled by a pressure regulator to have a preset pressure, and the fuel is guided into the pump 51 through a low-pressure pipe 9, compressed by the pump 1, and pressure-fed from the fuel outlet to a common fuel supply rail 53. The common fuel supply rail 53 contains as many injectors 54 as there are cylinders in the engine, as well as a pressure sensor 56. The injectors inject fuel in response to signals received from the controller 55.

The operation of the high-pressure fuel pump having the above-described configuration will be described in more detail.

As explained above, the plunger 2 reciprocates in response to rotation of the cam 100, which is driven by the engine cam shaft 72, and thus the volume in the compression chamber 12 varies in accordance with this cyclic rotation. If the suction valve 5 closes when the plunger is in a discharge stroke, the pressure in the compression chamber 12 goes up and the discharge valve 6 opens. In this way, fuel is pressure-fed to the common fuel supply rail 53 from the comparison chamber 12.

The suction valve 5 automatically opens when the pressure in the compression chamber falls below the fuel inlet pressure, but closes in response to the operation of the solenoid 200.

When the solenoid 200 is on (active), the solenoid produces an electromagnetic force greater than the pushing force of the spring 202 and pulls the connecting member 201 towards the solenoid. As a result, the connecting member moves away from the suction valve 5. While this status lasts, the suction valve operates as an automatic valve which opens and closes in synchronism with the reciprocating motion of the plunger 2. In other words, the suction valve 5 closes in the discharge stroke, and fuel in an amount corresponding the volumetric decrement of the compression chamber 12 is pressure-fed to the common fuel supply rail 53 through the discharge valve 6. This makes the discharge rate of the pump maximum.

On the other hand, when the solenoid 200 is off (inactive), the force of the spring 202 pushes the connecting member to open the suction valve 5 and to hold it open. In this status, the pressure in the compression chamber 12 is approximately as low as the fuel inlet pressure also in the discharge stroke, and the discharge valve 6 remains closed. Therefore, fuel in an amount corresponding to the volumetric decrement of the compression chamber 12 is fed back to the fuel inlet port through the suction valve 5. As a result, the discharge rate of the pump is 0.

When the solenoid 200 is turned on halfway in the discharge stroke, the pressure-feeding of fuel to the common fuel supply rail 53 starts. Once it starts, the pressure in the compression chamber 12 goes up and the suction valve 5 remains closed even when the solenoid is turned off thereafter. The suction valve 5 opens in synchronism with the start of the suction stroke after the discharge stroke is complete. Thus, it is possible to control the fuel discharge rate in the range of 0% to 100% by the "on" timing of the solenoid 20.

To keep the pressure in the common fuel supply rail 53 approximately constant, the controller calculates an adequate discharge timing and controls the solenoid using the result of this calculation.

In the above description, it is indicated that the high-pressure fuel pump 101 is a variable-volume pump using a single plunger whose discharge rate can be varied by the solenoid 202. A single plunger pump like this high-pressure fuel pump 101 is simple in configuration and facilitates variation of the volume. Further, it is less expensive and smaller than any other type of pump, but its discharge is intermittent and the pressure in the common fuel supply rail 53 greatly pulsates. This causes unevenness in the fuel ejection rates.

To solve this problem, the fuel supply system for an inline 4-cylinder engine of the type shown in FIG. 1(b), which represents an embodiment of the present invention, has a 2-peak cam 100 mounted on an engine cam shaft 72 so that the plunger 2 may make two reciprocations when the cam makes one revolution. With this arrangement, the plunger 2 makes one reciprocation, while an injector 54 makes two cylinder injections. Further, the phase of the pulsating pressure in the common fuel supply rail 53 can be in synchronism with the phase of the fuel injection.

If the pulsating pressure is great, the fuel pressure may go down or up according to the injection timing of an injector 54. In this case, unless the displacement of the plunger is in synchronism with the injection timing of the injector, the fuel pressure varies for each injection and the fuel injection rate may vary even when the valve opening time is constant.

Although in this embodiment, the cam 100 is driven by the engine cam shaft 72, which revolves at a rotational speed half as high as the engine speed, it is possible to drive a 1-peak cam using a crank shaft or the like that revolves at the same speed as the engine.

Figure 2:
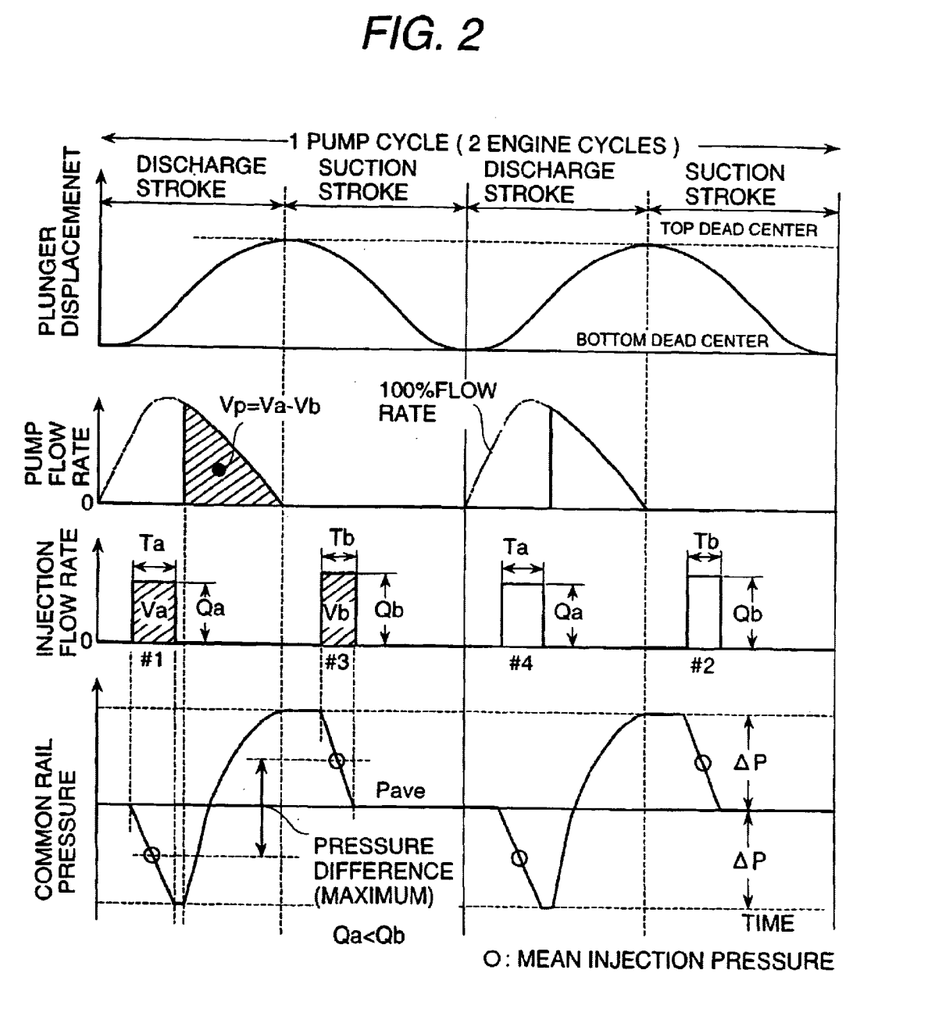
FIG. 2 is a waveform diagram showing an example of waveforms for correction of injection time by the fuel supply system of the present invention.

FIG. 2 shows time-response waveforms of the plunger displacement, the pump flow rate, the injection rate of the injector, and the common fuel supply rail pressure for one pump revolution (one cam revolution and two engine revolutions).

In FIG. 2, the plunger makes two reciprocations and the engine makes two revolutions while the cam 100 makes one revolution. As in a standard 4-cycle engine, each cylinder produces one combustion while the engine makes two revolutions. In other words, the four injectors respectively produce one fuel injection while the cam 100 makes one revolution. This enables the pump to supply fuel for two injectors at every discharge.

For easy comprehension of this mechanism, let's assume that the injectors of an inline 4-cylinder engine are assigned numbers as shown in FIG. 1. The injectors #1 to #4 inject fuel in the order of #1, #3, #4, and #2 (where "#" means "Number") as shown in FIG. 2. This mechanism can synchronize the plunger displacement and the injection timing of injectors with each other, but this mechanism classifies injectors into two groups: injectors which inject during the suction stroke and injectors which inject during the delivery stroke of the pump (to be explained later). This still results in a problem in that the injection rates of the injectors are uneven.

To avoid this, it is ideal if the pump can be controlled to make one discharge for each one-cylinder injection of the injector. For example, an inline 4-cylinder engine can have a 4-lobe cam which allows the plunger to make four reciprocations during one revolution of the cam. However, for an engine whose maximum speed is 8,000 revolutions per minute, the plunger must make a high number of reciprocations (250 reciprocations per second). Judging from the durability, size, and efficiency of the pump, it is hard to produce a pump that is capable of such performance. Further, in an engine that has more cylinders (6 cylinders, 8 cylinders or more), the cam must have more lobes. This requires an even larger number of reciprocations of the plunger and greater dimensions of the cam. Of course, it is certain that such a mechanism cannot be produced.

In particular, the pump cavitation trouble becomes more serious as the plunger speed goes higher and the suction pressure goes lower. Pump cavitation will drastically reduce the pump efficiency and durability. Further, an additional apparatus, such as a damper, is required to prevent such a problem. This increases the production cost and size of the engine.

Judging from the above, the fuel supply system of the present invention is designed so that the pump may make one discharge for two cylinder injections of the injectors. This suppresses the reciprocating frequency of the plunger to a low level and facilitates downsizing, cost reduction, and high efficiency of the pump. However, the unevenness of the injection rates of the injectors appears more conspicuously.

Thus, the present invention provides a method of reducing the unevenness of fuel injection rates at the cylinders by correcting the injection time width of each injector relative to a target injection time width of each injector, which is calculated from the running status of the engine.

Referring to FIG. 2, the mechanism by which the unevenness of the injection rates is generated will be considered in detail.

In FIG. 2, the dot-dash line in the Time vs Pump Flow Rate graph indicates the flow rate of fuel when the pump makes a 100% discharge. The solid line indicates the actual discharge rate. Operation starts when the solenoid is turned on (not visible). The injector discharges only the required quantity of fuel. Therefore, the discharge volume Vp per discharge of the pump (hatched part) is equal to the total of the injection volumes Va+Vb of the two injectors adjoining in the injection order.

The common fuel supply rail pressure (at the bottom of FIG. 2) cyclically repeats the steps of decreasing by $\Delta P$ relative to the mean pressure Pave when an injector injects, increasing by $2 \times \Delta P$ when the pump discharges, and decreasing again by $\Delta P$ down to Pave when the next injector injects. So injectors #1 and #4, which inject in the discharge stroke, inject less fuel because they inject while the common fuel supply rail pressure is low, and injectors #2 and #3, which inject in the suction stroke, inject more fuel. This is the main cause of the unevenness the injection rates. Circles "o" in the graph designate a common rail pressure during injection. This graph clearly shows that the difference between the mean injection pressures of the injectors which are adjoining in the injection order is greatest.

Although FIG. 2 shows an example of waveforms produced when the pump discharge period does not overlap with the injection period of the injectors, the waveforms will be more complicated when the pump discharge period overlaps with the injection period of the injectors. In the latter case, there is a tendency for the difference between the mean injection pressures of the injectors to become smaller and the unevenness of the injection rates becomes smaller, too. As shown in FIG. 2, the unevenness of the injection rates becomes greatest when the pressure difference becomes the greatest.

The present invention determines the maximum time width to correct the injection time width, assuming that the pump discharge period for the maximum unevenness of the injection rates does not overlap with the injection period of the injectors.

How the unevenness of the injection rates is corrected in accordance with the present invention will now be described.

In accordance with the present invention, the injection time width Ta of the injectors (#1 and #4 in the above description) which inject at a low injection pressure is made longer, by a correction time width $\Delta T$, than the target injection time width Tref of the injector, which correction time with ΔT is calculated from the running status of the engine. In contrast, the injection time width Tb of injectors (#2 and #3 in the above description) which inject at a high injection pressure is made shorter, by a correction time width ΔT, than Tref. Ta and Tb are expressed as shown below.

$$T_a = T_{ref} + \Delta T \quad \text{(Formula 1)}$$

$$T_b = T_{ref} + \Delta T \quad \text{(Formula 2)}$$

The injection rates Qa and Qb of injectors are approximately expressed with the mean injection pressure by the following:

$$Qa \cong c \cdot a \sqrt{\frac{2 \cdot \{(P_{ave} + (P_{ave} - \Delta P))/2\}}{\rho}} = c \cdot a \sqrt{\frac{2 \cdot P_{ave} - \Delta P}{\rho}} \quad \text{(Formula 3)}$$

$$Qb \cong c \cdot a \sqrt{\frac{2 \cdot \{(P_{ave} + (P_{ave} + \Delta P))/2\}}{\rho}} = c \cdot a \sqrt{\frac{2 \cdot P_{ave} + \Delta P}{\rho}} \quad \text{(Formula 4)}$$

wherein "c" is a flow rate coefficient of an injector, "a" is an opening area, and "ρ" is a fuel density.

The volumes Va and Vb of fuel injected at each injection are expressed by the following:

$$V_a = Q_a \times T_a \quad \text{(Formula 5)}$$

$$V_b = Q_b \times T_b \quad \text{(Formula 6)}$$

Since the injection rates become even when Va=Vb, the correction time width ΔT is calculated to make Va equal to Vb. For Va=Vb, we obtain $$Q_a \times T_a = Q_b \times T_b \quad \text{(Formula 7)}$$

The meaning of this relationship is quite obvious from the Injection Rate vs Time graph of FIG. 2. Namely, since there is a difference between mean injection pressures, Qa is less than Qb. Therefore, we can make Va equal to Vb (the hatched areas) by making Ta greater than Tb.

By substituting Formula 1 to Formula 4 for Formula 7 and solving for ΔT, we obtain the following:

$$\Delta T_{max} = \frac{2 \cdot P_{ave} - \sqrt{4 \cdot P_{ave}^2 - \Delta P^2}}{\Delta P} \cdot T_{ref} \quad \text{(Formula 8)}$$

ΔTmax is used instead of ΔT in Formula 8. This is because FIG. 2 shows a mode in which the unevenness of injection rates becomes greatest and the correction time width ΔT becomes greatest in this mode. This ΔT is the maximum correction time width ΔTmax.

From Formula 8, it is apparent that the maximum correction time width ΔTmax can be calculated from the mean pressure Pave and a half amplitude ΔP of the pressure pulsation. Pave and ΔP can be measured from pressure sensor signals while the engine is running, and so it is possible to calculate and correct using sensor signals in a realtime manner.

It is also possible to estimate Pave and ΔP in the following way. In this regard, it is typically necessary to shorten the sampling period down to about 1 ms to detect a pressure difference ΔP accurately, since the pressure changes very quickly. A conventional controller is not able to detect ΔP accurately because its sampling and processing cycle is a few ms to about 10 ms in length. Thus, an expensive faster controller is required to detect such ΔP, or it is required to fetch data for a long time, extract maximum and minimum points from a lot of data points, and calculate ΔP to increase the accuracy of ΔP. However, this extends the control period and reduces the ability to follow up changes in the operating conditions of the engine.

Therefore, the present invention estimates ΔP from the target injection time width Tref of each injector by calculation. Here, since the coefficient B of bulk modulus of fuel and the volume Vc of the common fuel supply rail are known, we can calculate ΔP from a compression formula, if we get the volume of injection of each injector. Assuming that the mean injection volume per injection is Vave (=(Va+Vb)/2), we obtain (P as follows:

$$\Delta P = \frac{V_{ave}}{V_c} \cdot B = \frac{Q_{ave} \cdot T_{ref}}{V_c} \cdot B = \frac{B \cdot T_{ref} \cdot c \cdot a}{V_c} \sqrt{\frac{2 \cdot P_{ave}}{\rho}} \quad \text{(Formula 9)}$$

wherein Qave is a mean injection rate expressed by $$Q_{ave} = \frac{Q_a + Q_b}{2} = c \cdot a \sqrt{\frac{2 \cdot P_{ave}}{\rho}} \quad \text{(Formula 10)}$$

The mean pressure Pave can be a target pressure to maintain a constant fuel pressure or an average of pressure sensor signal values. With this, the system can fetch ever-changing fuel pressures at high speed, detect Pave and ΔP without calculating them, and correct the injection time width.

Next, a method of correcting the injection time width, when the discharge time period and the injection time period overlap with each other, will be considered.

Although FIG. 2 shows an example of waveforms which occur when the pump discharge period does not overlap with the injection period of the injectors, it frequently happens that these periods do overlap and that the injector which injects fuel during the discharge stroke and the injector which injects during the suction stroke change strokes as the phase of the fuel injection of the injectors varies a lot relative to the pump discharge. Particularly, in a direct injection engine, the phases by the injections of injectors will vary a lot since there are two fuel injection cases according to the loading status of the engine: injection during the suction stroke of the engine and injection during the compression stroke of the engine.

Further, some engines have a variable valve timing mechanism in which the phase of the engine cam shaft is varied by an actuator. When the cam 100 of the high-pressure fuel pump is driven by the engine cam shaft 72, the phase of the pump discharge also varies. Therefore, a method is required to flexibly correct such a great phase change in the pump discharge and the injection of the injectors.

Figure 3:
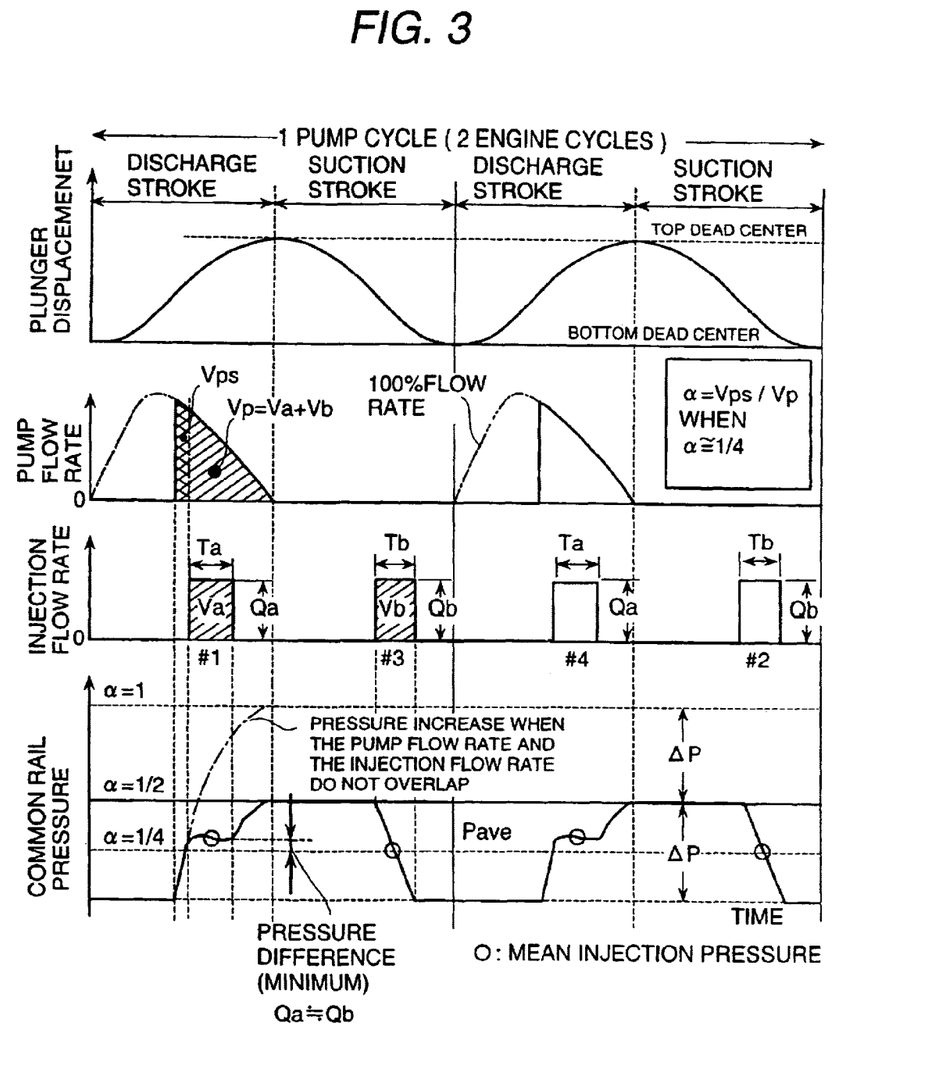
FIG. 3 is a waveform diagram showing an example of waveforms for correction of injection time by the fuel supply system of the present invention.
Figure 4:
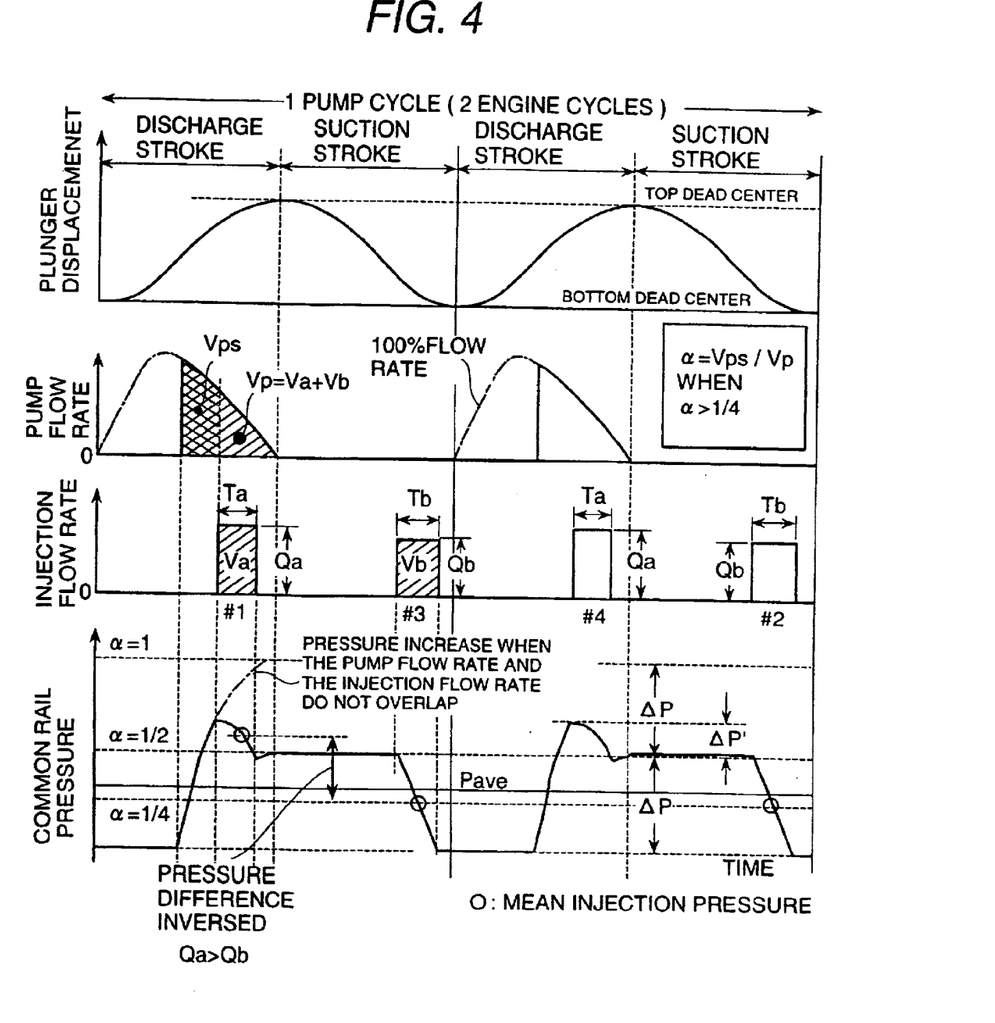
FIG. 4 is a waveform diagram showing an example of waveforms for correction of injection time by the fuel supply system of the present invention.
Figure 5:
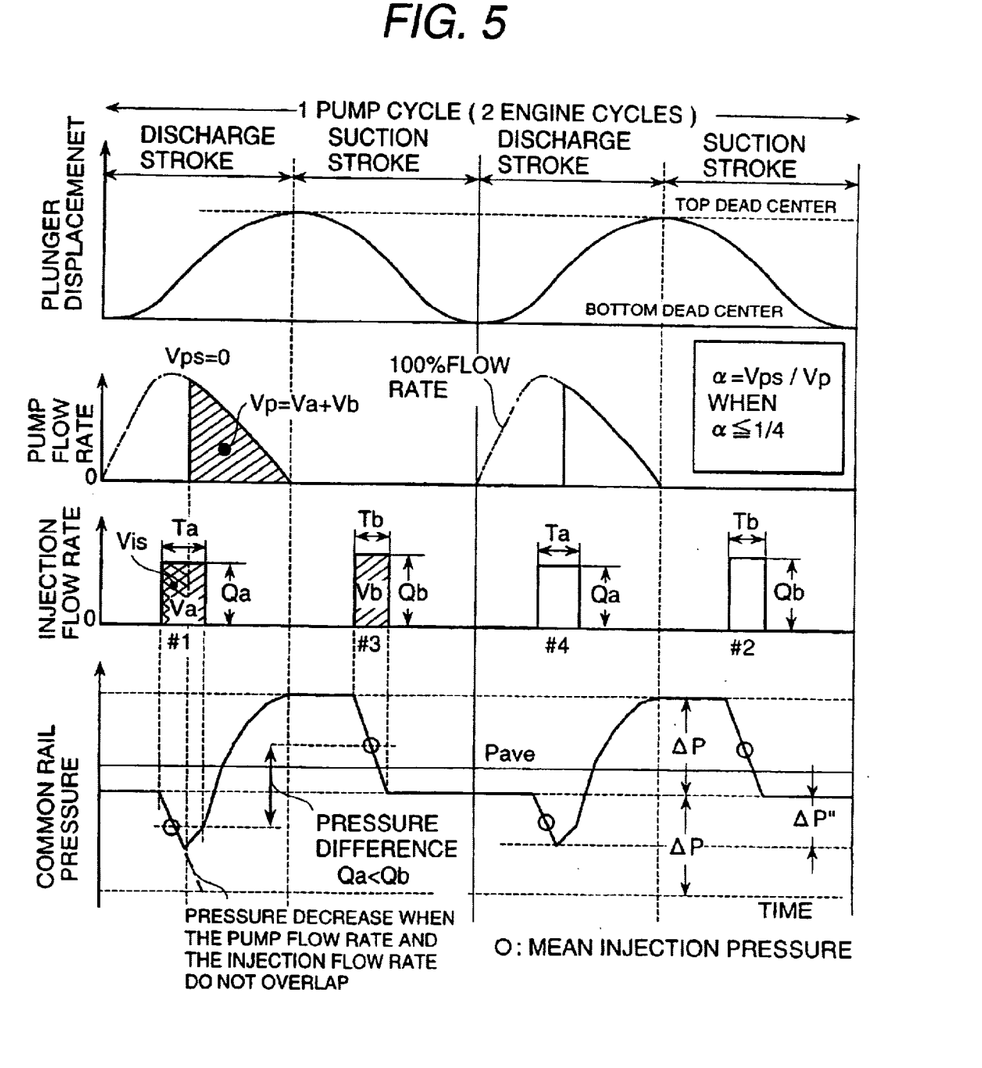
FIG. 5 is a waveform diagram showing an example of waveforms for correction of injection time by the fuel supply system of the present invention.

FIG. 3 to FIG. 5 show examples of waveforms which occur when the pump discharge period overlaps with the injection period of the injectors.

FIG. 3 shows examples of waveforms which occur when the pump discharge period completely overlaps with the injection period of the injectors. In comparison to FIG. 2, it can be seen that the pulse amplitude (ΔP) of the common fuel supply rail pressure in FIG. 3 is half of that in FIG. 2

(2×ΔP). This is because the pressure increment due to the pump discharge is offset by injection of the injector. In this case, the difference between mean injection pressures of injectors adjoining in the injection order becomes very small and the unevenness of injection rates is also small enough to skip correction.

Here, we define Vps as the quantity (volume) of fuel that the pump has discharged before the injection start point of the injector, whose injection period overlaps with the discharge period of the pump, and α (=Vps/Vp) as a ratio of Vps to the total discharge volume per discharge. In other words, α represents the timing of the pump discharge at which the injector injects fuel. The rise of the common fuel supply rail pressure before the injector starts to inject fuel varies according to the value of "α." As shown in FIG. 3, the pressure rise indicated by a dot-dash line (which is 2×ΔP in case the pump discharge rate does not overlap with the injection rate) is up to ΔP, if "α" is ½, or ΔP/2, if "α" is up to ¼.

FIG. 3 shows waveforms when "α" is about ¼. In this case, the difference between mean injection pressures of injectors adjoining in the injection order is very small and the unevenness of injection rates is also very small.

FIG. 4 shows an example of the waveform which occurs when "α" is greater than ¼, particularly, when "α" is ⅔. In this case, the mean injection pressure of an injector (#1 or #4 in the example) whose injection timing overlaps with the discharge timing of the pump is higher than the mean injection pressure of an injector (#2 or #3 in the example) whose injection timing does not overlap with the discharge timing, and the injection rate Qa is greater than the injection rate Qb. Therefore, the injection time width Ta of the former injector must be shorter than the injection time width Tb of the latter injector. In this case, the difference between mean injection pressures becomes greater because the pressure ΔP' in FIG. 4 increases as "α" becomes greater.

FIG. 5 shows an example of the waveform which occurs when "αa" is smaller than ¼, particularly, when "α" is 0. In this case, which is opposite to the case of FIG. 4, the injection rate Qa is smaller than the injection rate Qb. Therefore, the injection time width Ta must be greater than Tb. If the phase of injection of an injector is shifted forward (relative to the phase in FIG. 5), the pressure ΔP" becomes bigger; and, as a result, the difference between mean injection pressures also becomes greater. However "α" remains 0 as Vps is always 0.

In other words, "α" alone is not enough to express the magnitude of the injection pressure difference. Here, Vis designates the quantity (volume) of fuel that the pump has discharged before the injection start point of the injector whose injection period overlaps with the discharge period of the pump (as shown in FIG. 5), and β(=Vis/Vp) designates a ratio of Vis to the discharge volume Vp. The fall of the common fuel supply rail pressure before the pump starts to discharge fuel varies according to the value of "β."

Thus by using α and β in combination, it is possible to express the magnitude of the injection pressures of two adjoining injectors under a wide range of conditions. This will be explained below with reference to FIG. 6.

Figure 6:
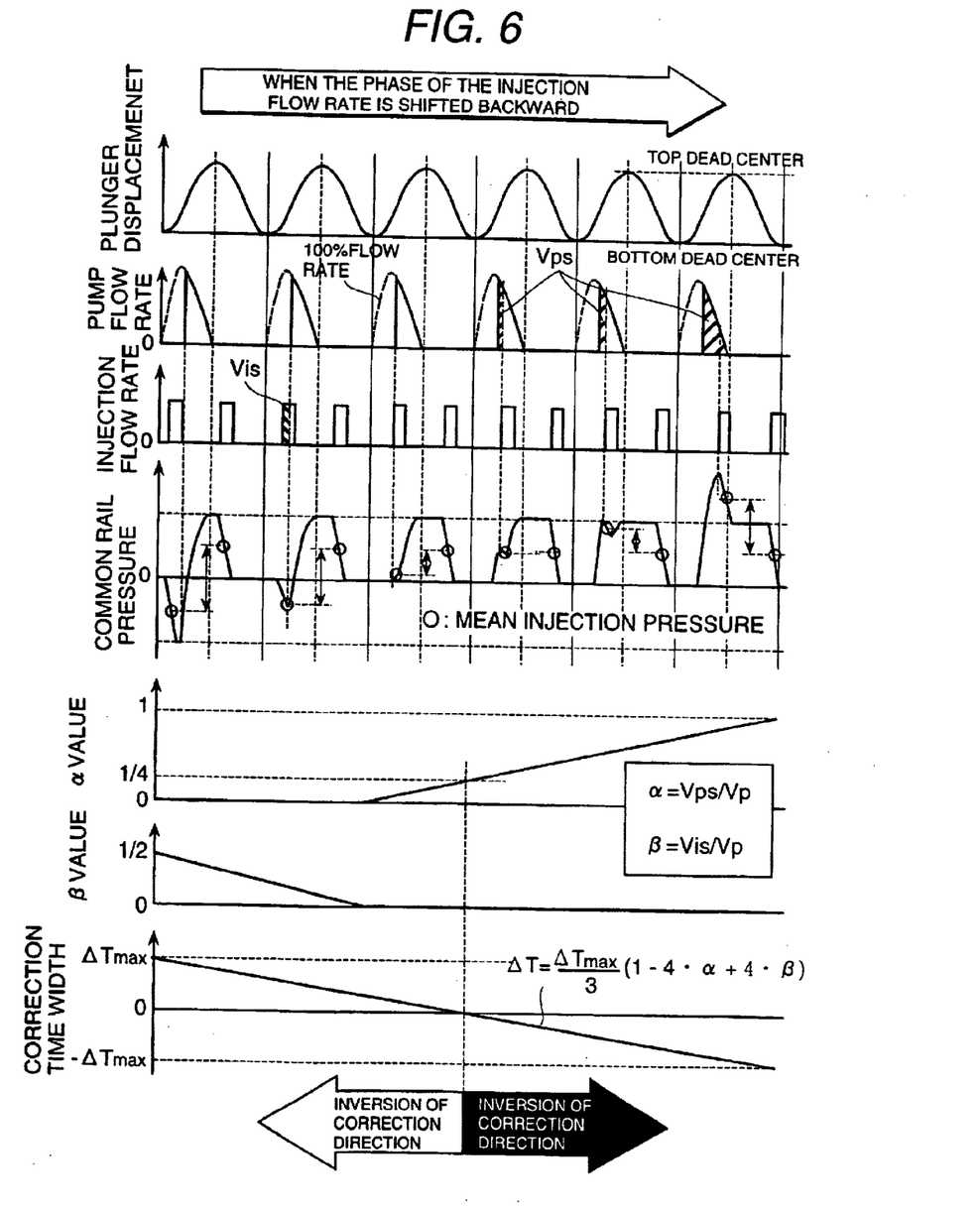
FIG. 6 is a waveform diagram which shows the behavior of waveforms when the injection phases of fuel injections in the fuel supply system of the present invention are shifted gradually.

FIG. 6 shows transitions of common fuel supply rail pressure, the value of α, the value of β, and the correction time width ΔT when the phases of the injection rates are shifted gradually. Note that the horizontal axis not a time base. At the left end of the graph, the pump discharge rate does not overlap with the injection rate. As you go to the right, the injection rate phase shifts backwards and the pump discharge rate starts to overlap with the injection rate. The injection pressure difference between two adjoining injectors (indicated by arrows) is the greatest at the leftmost end of the graph, it gradually decreases as you go to the right, and it reaches 0 near the center (α=¼). Further, as you go to the right (when α>¼), the injection pressure difference goes negative (or the injector pressures are reversed) and the pressure difference gradually becomes greater. The α and β values behave as shown in FIG. 6 and are 0 at the same time. By using α and β in combination, it is possible to digitally express the change of the injection pressure difference relative to the injection phase change. Consequently, the correction time width ΔT can be expressed as a function of α and β as shown in FIG. 6.

$$\Delta T = \frac{\Delta T_{\max}}{3}(1 - 4\cdot\alpha + 4\cdot\beta) \quad \text{(Formula 11)}$$

This defines a line connecting a point of the maximum correction time width ΔTmax when the pump discharge rate does not overlap with the injection rate and a point of a correction time width 0 when the injection pressure difference at Δ=¼ is about 0 and is a function of α and β. With two parameters α and β this function can determine the magnitude and direction of the correction time width at the same time.

Figure 7:
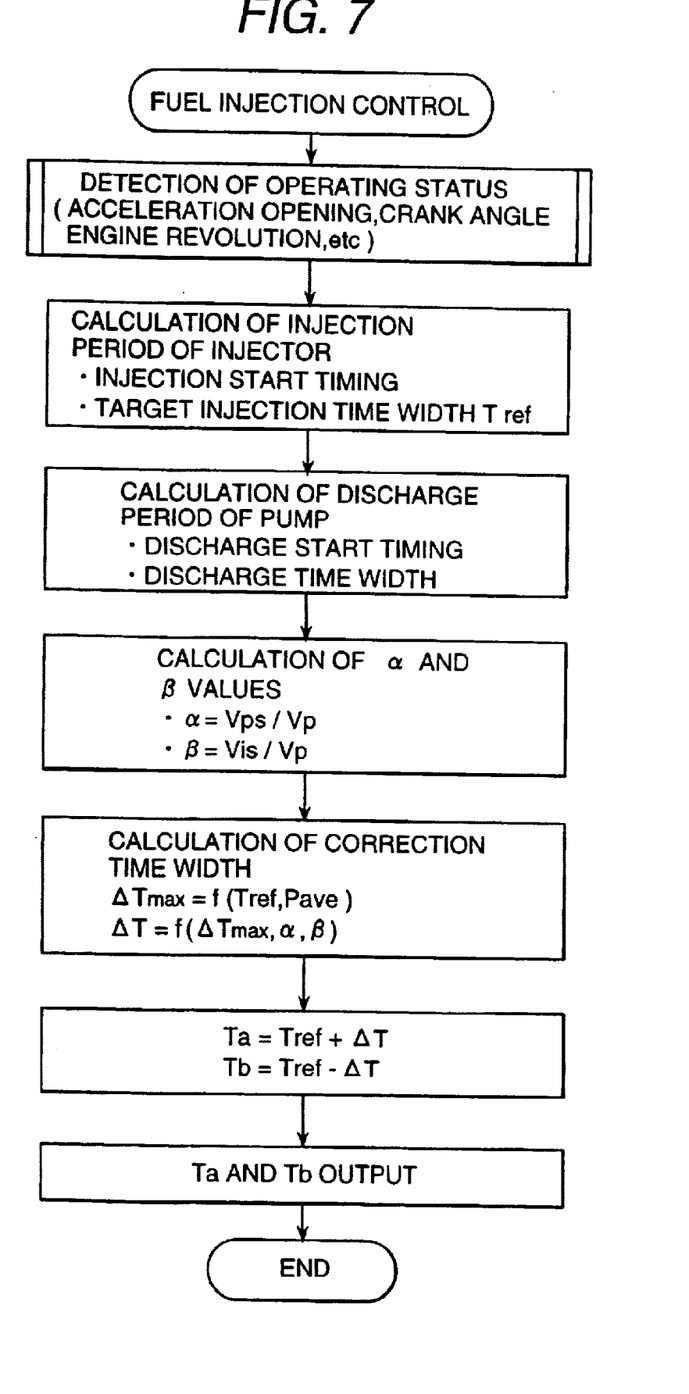
FIG. 7 is a flowchart of the processing for correcting the injection time by the fuel supply system of the present invention.

FIG. 7 shows a flow in the process of correcting injection times in the fuel supply system of the present invention.

In FIG. 7, when starting fuel injection rate control, the controller detects the running status of the engine from the acceleration opening, the crank angle, the engine speed, etc. and determines an injection start timing and a target injection time width Tref of each injector. Next, the controller calculates a discharge start timing and a discharge time width of the pump from information, such as the crank angle and the engine speed, checks the overlapping between the injection period of each injector and the discharge period of the pump, and determines α and β values. To get a correction time width, the controller calculates the maximum correction time width ΔTmax from the target injection time width Tref and the mean fuel supply pressure Pave, and determines the correction time width ΔT from (Tmax, the α value, and the β value. Finally, the controller adds this correction time width ΔT to the target injection time width Tref or subtracts the correction time width ΔT from the target injection time width Tref, calculates injection time widths Ta and Tb of the injectors, and outputs the Ta and Tb values. With this, one control cycle is complete.

Since the fuel supply system in accordance with the present invention offers only two injection time widths, one of which is for half of all injectors and the other for the remaining half of the injectors, the controller need not calculate any more injection time widths even when the engine has more cylinders (6, 8 or more cylinders). Unless the running status of the engine, such as engine speed and acceleration opening, undergoes a rapid change, the Ta values of injectors #1 and #4 in FIG. 4 need not be changed. Therefore, every one to some revolutions of the pump is enough as the operation period of one control cycle. This can greatly reduce the processing load on the controller.

Figure 8:
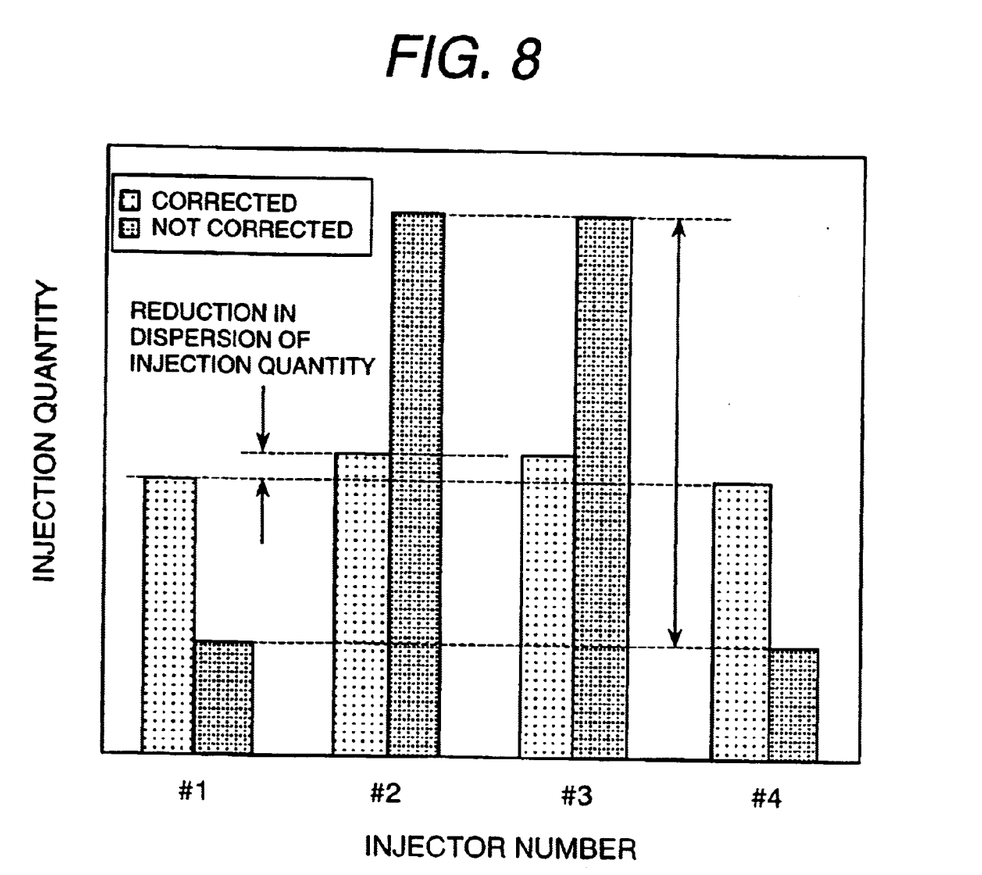
FIG. 8 is a graph which shows the effect of correction of the injection time by the fuel supply system of the present invention.

FIG. 8 shows the result of correction of unevenness of injection rates according to the above algorithm. For a representative Tref value of 3.5 mm, we can get ΔT of 0.03 ms. In this case, the pulse widths Ta and Tb after correction are:

Ta=3.5+0.03=3.53 ms and Tb=3.5−0.03=3.47 ms.

As shown in FIG. 8, we have reconfirmed by numeric simulation or the like that this correction can greatly reduce the unevenness of the injection rates.

Figure 9:
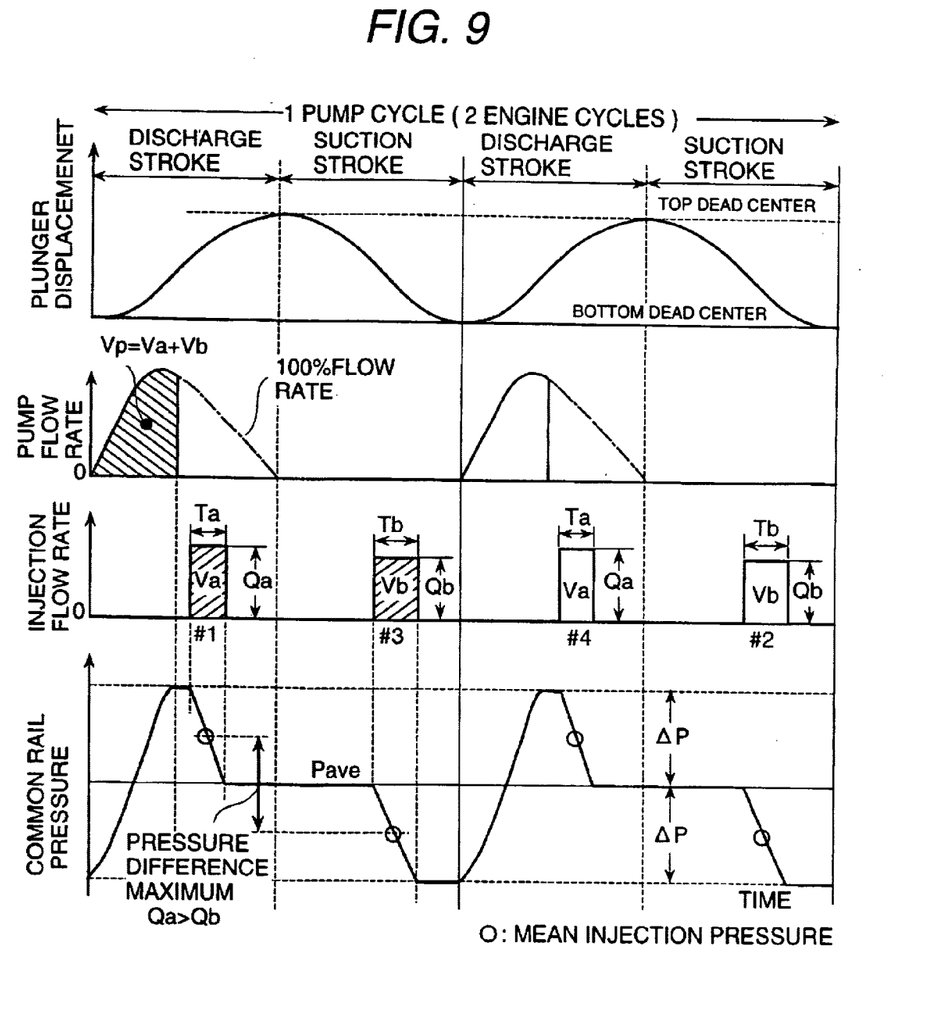
FIG. 9 is a waveform diagram which shows an example of the correction of the injection time in a system having a high-pressure fuel pump of another type.

The fuel supply system, which is the embodiment of the present invention in FIG. 1 to FIG. 6, uses a high-pressure fuel pump, which is constructed as shown in FIG. 1. For variable volume control, this pump discharges fuel halfway in the discharge stroke without discharging from the start of the discharge stroke. There also exist pumps that discharge fuel from the start of the discharge stroke and stop discharging halfway in the discharge stroke for variable volume control. The fuel supply system of the present system can also correct the unevenness of injection rates even when a variable-volume single-cylinder plunger having such a construction is used. FIG. 9 shows an example of this form of correction.

FIG. 2 shows an example of waveforms that occur when the pump discharge rate does not overlap with the injection rate of injectors. A great difference between FIG. 2 and FIG. 9 is seen in the waveforms of the pump discharge rates. Similarly to FIG. 2, the mean injection pressure of an injector (#1 or #4 in this example) which injects fuel just after the pump stops discharging is higher than the mean injection pressure of an injector (#2 or #3 in this example) which injects fuel after the injector #1 or #4. Therefore, the injection rate Qa is greater than the injection rate Qb. In this case, the unevenness of injection rates can be corrected by making the injection time width Ta smaller than Tb. We can also get a correction time width by calculating the maximum correction time width $\Delta Tmax$ from the target injection time width Tref and the mean fuel supply pressure Pave, and calculating the correction time width $\Delta T$ from $\Delta Tmax$, the value of $\alpha$, and the value of $\beta$. It is apparent that a similar correction can be done according to the algorithm of the present invention, although a $\alpha$ and $\beta$ must be defined a little differently.

Although the above embodiment is so designed that the controller can always correct the injection time widths, the correction can be omitted when the target injection time width Tref is short enough, because the half amplitude (P of the pulsating pressure becomes smaller and the unevenness of injection rates is small enough from the start. This can reduce the processing load on the controller. Further, there is almost no difference between mean injection pressures of two injectors adjoining in the injection order when the value of a is near ¼, and the unevenness of the injection rates is small enough to omit the correction of injection time widths. Further, when a is near ¼, it is difficult to judge which injector has a higher fuel injection pressure, because it depends upon the running condition of the engine. If a wrong correction is made, the injection rates may have even more unevenness. Therefore, this omission of correction at $\alpha$=about ¼ can not only suppress the unevenness of injection rates, but also reduce the processing load on the controller.

As explained above, the fuel supply system which is an embodiment of the present invention uses three parameters, such as "target injection time width" of respective injectors, "mean fuel supply pressure," and "overlapping" between the discharge period of the pump and the injection period of the injector, to correct the injection time width. With this, the controller can correct the injection time width without fetching ever-changing fuel pressures at high speed and reduce the unevenness of injection rates without a high processing load.

On the other hand, if fuel pressure signals can be obtained at a high speed, the fuel supply system can use this kind of information to correct the injection time widths. More specifically, the unevenness of the injection rates can be reduced by extending the injection time width of an injector whose fuel supply pressure is lower, shortening the injection time width of an injector whose fuel supply pressure is higher and determining the increment or decrement of a correction time width according to the pressure difference between injectors.

As explained above, the fuel supply system of the present invention can suppress the unevenness of fuel injection rates of cylinders to a low level. With this, the ECU (engine control unit) can reduce correction of the air-fuel ratio and perform stable engine control. Further, since the fuel supply system of the present invention can accurately control the fuel injection rate that the engine requires, the system can obtain the optimum combustion status and improve the power performance, fuel consumption ratio, and exhaust composition of the engine. Further, the system can keep the injection rate unevenness at a low level even when the common fuel supply rail has a small volume. This improves the ability to increase and decrease the fuel pressure of the engine. Consequently, this system can increase the compressing ability at the time of starting of the engine and the responsiveness to a change in the target fuel supply pressure at the time of transient running.

Particularly, the present invention aims at providing a fuel supply system comprising a variable-volume single plunger pump which is designed to make one discharge, while two injections are made by the injectors, and a controller which keeps the fuel supply pressure approximately constant by a variable volume control of the pump.

Generally, a single plunger pump takes in and discharges fuel intermittently, which causes the discharge pressure to pulsate greatly. This causes an unevenness in the injection rates of the injectors. However, the present invention can eliminate such unevenness and provide a fuel supply system which achieves best use of the merits of the pump, such as low cost and energy saving.

In summary, the fuel supply system of the present invention reduces the unevenness of fuel injection rates of the cylinders by correcting the injection time width of the respective injector relative to the target injection time width of the injector, which is calculated from the running status of the engine. Basically, the fuel supply system of the present invention makes the injection time width of one of two fuel injection valves, which inject during one discharge of the pump longer, and that of the other injector shorter. In this case, the controller determines which injector is to be selected to have its injection time width longer or shorter from the injection timing of the injector in response to the discharge of the pump.

For example, immediately after the pump completes one discharge, the fuel pressure is higher than the mean pressure. Accordingly, the injection rate of an injector which injects at this time increases. After this injector injects fuel, the fuel pressure decreases. Accordingly, the fuel injection rate of the next injector becomes relatively less. Therefore, it is possible to reduce the unevenness of the injection rates by shortening the injection time width of the former injector and extending the injection time width of the latter injector.

More specifically, the controller detects an overlapping between the discharge period of the pump and the injection period of each injector. When the periods do not overlap with each other, the controller operates to shorten the injection time width of an injector which injects first after the pump ends one discharge and extends the injection time width of an injector which injects next. When the periods overlap with each other and the quantity of fuel that the pump discharges, before the start of injection of an injector whose injection period overlaps with the discharge period of the pump, is about ¼ or less of the total quantity of fuel discharged, the controller extends the injection time width of an injector whose injection period overlaps with the discharge period of the pump and shortens the injection time width of the other injector. When the quantity of fuel that the pump discharges, before the start of injection of an injector whose injection period overlaps with the discharge period of the pump, is about ¼ or more of the total quantity of fuel discharged, the controller shortens the injection time width of an injector whose injection period overlaps with the discharge period of the pump and extends the injection time width of the other injector. This is because the fuel pressure of an injector goes lower or higher than the fuel pressure of the other injector according to the timing of injection of the injector relative to the discharge of the pump. The turning point of this is located where the quantity of fuel that the pump discharges, before the start of injection of an injector whose injection period overlaps with the discharge period of the pump, is about ¼ of the total quantity of fuel discharged.

As for determination of a correction time width, the unevenness of injection rates becomes greater as the difference between fuel injection pressures of two injectors becomes greater. It is also dependent upon the magnitude of the mean fuel supply pressure. Further, the injection pressure difference has a tendency to become greater as the injection time width becomes greater. As already explained above, the injection pressure difference varies according to the status of overlapping between the pump discharge period and the injection period. In a particular range, the injection pressure difference may be extremely small. On the other hand, when the periods do not overlap, the pressure difference and the unevenness of injection rates are greatest.

The fuel supply system of the present invention determines the maximum correction time width when the discharge period does not overlap with the injection period from a target injection time width and a mean fuel supply pressure and makes the correction time width shorter than the maximum correction time width according to the extent of overlapping between the discharge period and the injection period before outputting it. With this, the fuel supply system can reduce the unevenness of the injection rates in the wide range of the running condition of the engine.

As explained above, the controller corrects the injection time width using three parameters of "target injection time width" of respective injectors, "mean fuel supply pressure," and "overlapping" between the discharge period of the pump and the injection period of the injector to correct the injection time width. The mean fuel supply pressure need not be based on values obtained from pressure sensors and can be a target value used to control the duel supply pressure constant. With this, the controller can correct the injection time width without fetching ever-changing fuel pressures at high speed and reduce the unevenness of injection rates without a high processing load. In accordance with the fuel supply system of the present invention, a sufficient processing cycle of the controller is one to some revolutions of the pump.

The system can correct the injection time width by using fuel pressure signals if they can be obtained at a comparatively high speed. More specifically, it is possible to reduce the unevenness of injection rates by extending the injection time width of an injector whose fuel supply pressure is lower, shortening the injection time width of an injector whose fuel supply pressure is higher, and determining the correction time width according to the pressure difference of two injectors.

The present invention can provide an engine fuel supply system which can reduce the unevenness of fuel injection rates of cylinders by correcting the injection command value for each injector without using information of ever-changing fuel pressure.

What is claim is:

1. A fuel supply system for a direct injection engine comprising a fuel pump which supplies fuel to fuel injectors by varying the volume by the reciprocal movement of a single-cylinder plunger, a driving mechanism which makes one reciprocal movement of said plunger while two of said fuel injectors inject fuel into two cylinders, and a controller which controls said fuel pump to adjust the fuel supply pressure, the injection start timing, and the injection time width of said two fuel injectors, wherein said controller operates to make the injection time width of one of said two fuel injectors longer than an initially set injection time width for said one of said two fuel injectors and that of the other of said two fuel injectors shorter than an initially set injection time width for said other of said two fuel injectors.

2. A fuel supply system in accordance with claim 1, wherein said controller operates to detect the start timing and time width of intermittent fuel discharge that said high pressure fuel pump makes in synchronism with said plunger and to correct the fuel injection time width of each of said two fuel injectors relative to a target injection time width according to a time period during which the discharge period of said high pressure fuel pump and the injection period of said two fuel injectors overlap with each other, the target injection time width of each of said two fuel injectors being calculated from the running status of said direct injection engine, and the mean value of said fuel supply pressures.

3. A fuel supply system in accordance with claim 1 or 2, wherein said controller operates to compare the phase of the discharge time period of said high pressure fuel pump by the phase of the injection time period of said fuel injectors, determine whether to increase or decrease said fuel injection time width for correction, determine a maximum injection time width to be corrected from said target fuel injection time width and the mean value of said fuel supply pressures, subtracting the correction time period to be given to each of said fuel injectors according to an overlapping between said discharge time period and said injection time period from said maximum fuel injection time width for correction, and output the result.

4. A fuel supply system in accordance with claim 1 or claim 2, wherein said controller operates to detect an overlapping between the discharge time period of said high pressure fuel pump and the injection time period of said fuel injectors, and if there is no overlapping between them, shorten the injection time period of a first one of the fuel injectors that first injects fuel after one discharge by said high pressure fuel pump is completed and extend the injection time period of a second one of the fuel injectors that injects fuel next, if there is an overlapping and if the high pressure fuel pump supplies about one fourth or less of the whole fuel discharge quantity by the injection start timing of the fuel injectors whose injection time period overlaps the discharge time period, extend the injection time period of the fuel injectors whose injection time period overlaps the discharge time period and shorten the injection time period of the other one of the fuel injectors, or if the high pressure fuel pump supplies about one fourth or more of the whole fuel discharge quantity, shorten the injection time period of the fuel injectors whose injection time period overlaps the discharge time period and extend the injection time period of the other one of the fuel injectors.

5. A fuel supply system in accordance with claim 1, wherein said controller operates to detect a pressure of supplying fuel to said fuel injection valve, extend the injection time width of one of the fuel injectors whose fuel supply pressure is lower, and shorten the injection time width of another of the fuel injectors whose fuel supply pressure is higher.

6. A fuel supply system according to claim 1, wherein said drive mechanism is a cam.

7. A fuel injection supply system for a direct injection engine comprising:
   a fuel pump coupled to first and second fuel injectors located to inject fuel into first and second cylinders, respectively;
   a driving mechanism to drive said fuel pump to provide fuel to said first and second fuel injectors, wherein, during one reciprocation of said driving mechanism, fuel is provided to both said first and second fuel injectors to inject fuel into both said first and second cylinders; and
   a controller to provide a first injection time width for said first fuel injector and a second injection time width for said second fuel injector during a single reciprocation of said driving mechanism, wherein said first injection time width is longer than said second injection time width.

8. A fuel supply system according to claim 7, wherein said driving mechanism is a cam.

9. A fuel supply system according to claim 7, wherein said fuel pump includes a single cylinder plunger.

10. A fuel injection supply system for a direct injection engine comprising:
    a fuel pump coupled to first and second fuel injectors located to inject fuel into first and second cylinders, respectively;
    reciprocating drive means for driving said fuel pump to provide fuel to both said first and second fuel injectors during a single reciprocation of said driving means; and
    control means for reducing unevenness of injection rates of said first and second cylinders by providing a first injection time width for said first fuel injector and a second injection time width for said second fuel injector during the single reciprocation of said driving means, wherein said first injection time width is longer than said second injection time width.

11. A fuel supply system according to claim 10, wherein said driving means is a cam.

12. A fuel supply system according to claim 10, wherein said fuel pump includes a single cylinder plunger.

13. A fuel supply system according to claim 1, wherein said fuel injectors adjoin one another in a fuel injection order.

14. A fuel supply system according to claim 7, wherein said first and second fuel injectors adjoin one another in a fuel injection order.

15. A fuel supply system according to claim 10, wherein said first and second fuel injectors adjoin one another in a fuel injection order.

* * * * *